INVENTOR
EDMUND S. MAYO, JR.

BY Edwin Vocker
AGENT

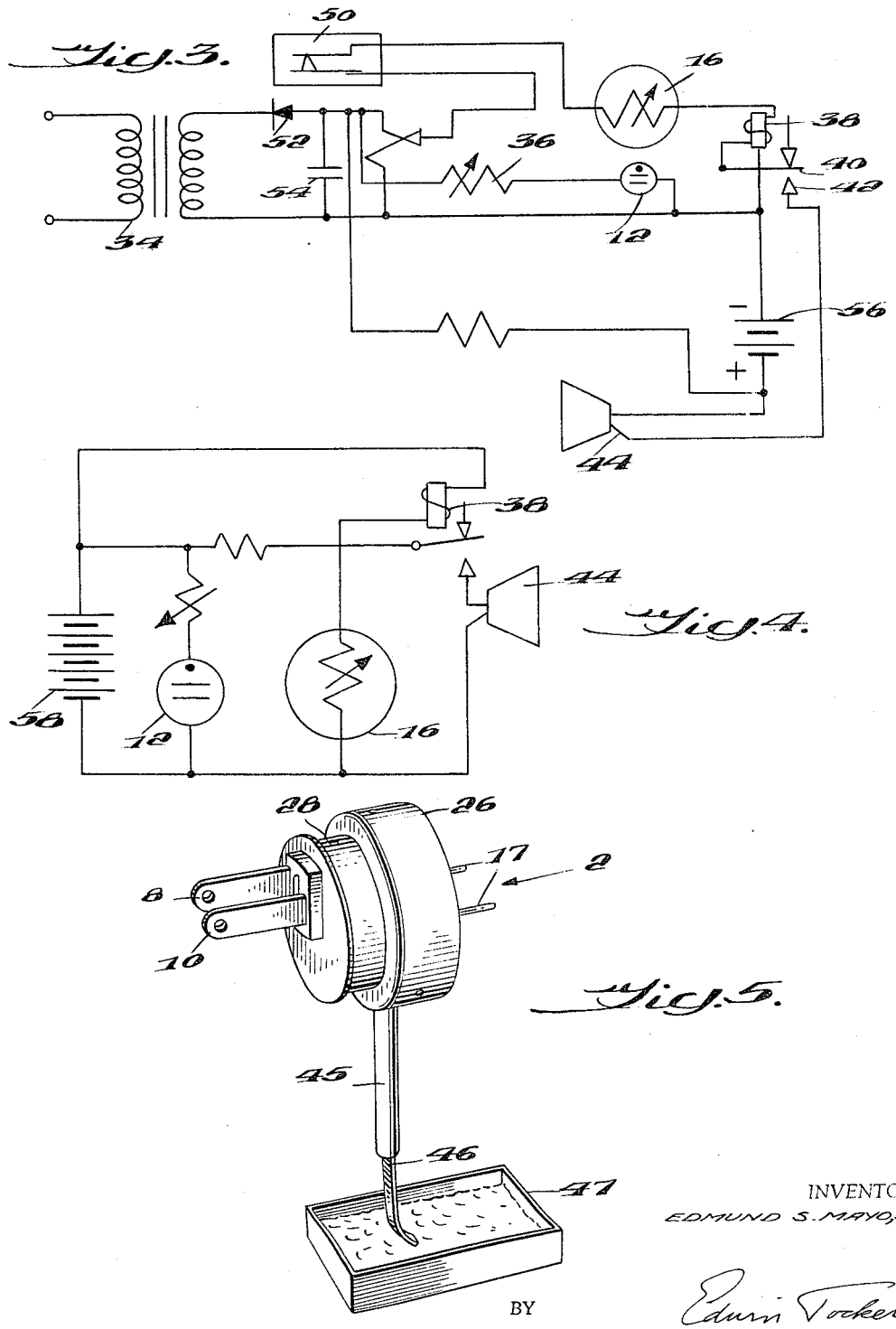

United States Patent Office 3,276,004
Patented Sept. 27, 1966

3,276,004
APPARATUS FOR DETECTING GAS
Edmund S. Mayo, Jr., Wilmington, Del., assignor to E. I. du Pont de Nemours and Company, Wilmington, Del., a corporation of Delaware
Filed Apr. 29, 1963, Ser. No. 276,404
2 Claims. (Cl. 340—237)

This invention relates to apparatus for detecting unsafe conditions such as fire and the presence of a noxious gas, and, particularly, to a detection unit of novel construction and general utility.

Present apparatus for the detection of noxious gases leave much to be desired in having one or more of the following disadvantages: high cost, bulky, non-continuous operation, and non-automatic, i.e., requires manually obtained determinations that may be influenced by operator error. With particular reference to carbon monoxide, instruments used for the detection of this gas must be simple enough and inexpensive enough to encourage their use in greater numbers throughout potentially hazardous areas in industrial plants as well as in the home and yet to still retain high sensitivity, reliability, and freedom from maintenance. Where CO detection instruments have been used in industry, they have often been lone installations of the more complex variety; such instrumentation has been beyond the reach of the average home owner.

It is an object of the present invention to provide a gas detection apparatus that does not have any of the foregoing mentioned disadvantages.

It is further an object to provide such apparatus which can also be used for the dual purpose of fire detection.

It is another object of the present invention to provide an apparatus including a compact detection unit which is operable in small as well as unconfined locations for detecting such unsafe conditions as the presence of noxious gas and fire.

It is a further object of the present invention to provide a detection unit having this utility and which is constructed to promote sampling of the surrounding atmosphere.

Another object of the present invention is to provide such a detection unit and which is pluggable into a standard electric outlet for operation either by an alternating current or by a direct current power supply.

Still another object of the present invention is to provide a gas detection apparatus for continuously and automatically monitoring gas below toxic levels for extended periods of time with a minimum of maintenance.

And still another object of the present invention is to provide a gas detection apparatus utilizing photoelectric sensing and reporting of color changes of a gas sensitive chemical reagent.

A still further object of the present invention is to provide a gas detection apparatus in which the degree of color change required to cause the sounding of an alarm is adjustable. Other objects will appear hereinafter.

These and other objects and advantages of the present invention will become apparent by reference to the following description and accompanying drawings, in which:

FIG. 3 shows schematically the photoelectric elements of the detection unit of the present invention and a representative alarm circuit to be used in place of the circuit of FIG. 1;

FIG. 4 shows schematically the photoelectric elements of the detection unit and another alternative alarm circuit to the circuit of FIG. 1; and FIG. 5 shows the detection unit of FIG. 1 modified to make the atmosphere therein moist.

Figure 1:
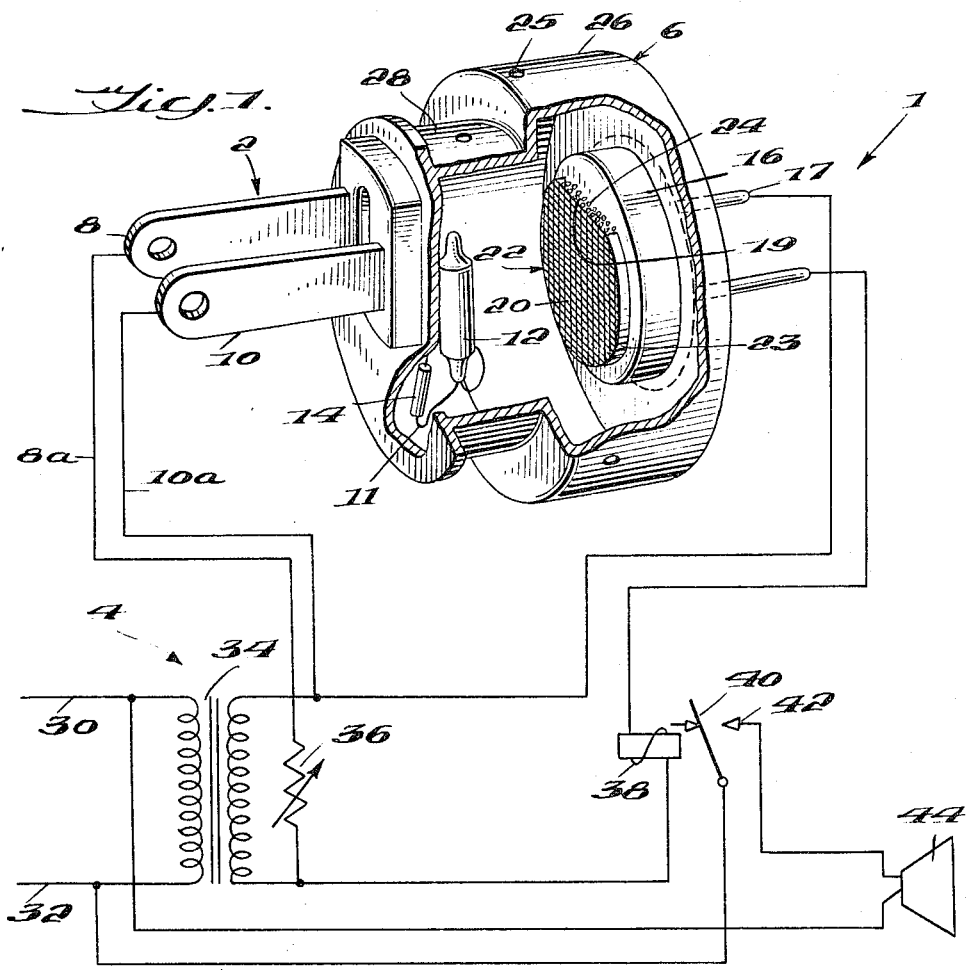
FIG. 1 depicts, in perspective, a partially cut-away view of a detection unit of the present invention and, in schematic, a photoelectric alarm circuit therefor.

The application of the invention to the monitoring of noxious gas will first be discussed. Referring now to FIG. 1, detector apparatus 1 consists generally of a detection unit 2 which is placed at the location where gas monitoring is to occur and an electric circuit 4 supplying power to unit 2, said circuit being capable of proximate or distant location with respect to unit 2. Unit 2 is composed of a housing 6, preferably made of plastic, having electrical connectors such as prongs 8 and 10 protruding from the rear thereof and adapted to be plugged into a standard 115 v. 60 c. electric receptacle (not shown). The unit can also be operated at different voltages or by a direct current power supply. Typically, housing 6 measures 1¾ inch in its greatest diameter and 1 inch in depth. This is about the size shown in FIGS. 2 and 5. The detection unit 2 shown in FIG. 1 is in double scale for purposes of magnifying the elements thereof.

Within housing 6 and electrically connected with prongs 8 and 10 by conductors 11 is mounted a light source such as neon lamp 12, such as a ¼ watt size, in series with current-limiting resistor 14. Spaced from and facing lamp 12 is mounted photodetector 16 so that changes in illumination from lamp 12 are observed by the photodetector. Terminals 17 are provided for connecting the photodetector to external circuitry. Reagent 19, which is color sensitive to the presence of a particular gas for which detection is desired, and its container 20 are designated a module of reagent 22, and in the embodiment shown, container 20 is a fine non-corrosive wire screen, e.g. 200 mesh, formed as an enclosure for and filled with reagent 19 and interposed before or mounted on the face of the photodetector 16 so as to be a substantial covering thereof. Thus, light from lamp 12 is transmitted through reagent 19 to reach photodetector 16. Accordingly, a change in color of the reagent affects the amount of light transmitted therethrough. When a certain amount of color change has occurred, corresponding to the presence of a certain amount of a particular gas, the photodetector 16 actuates alarm equipment as will be later explained, thereby warning personnel of this fact. Screen 20 can form one side of the container for the reagent 19 and the face of photodetector 16 the other as shown in FIG. 1, or screen 20 can form both sides of the container.

An annular noncorrosive spacer 23 is positioned between screen 20 and the face of photodetector 16 so as to form a container for the reagent 19. Spacer 23 has a separation 24 at the top thereof to permit loading of reagent into the container.

Figure 2:
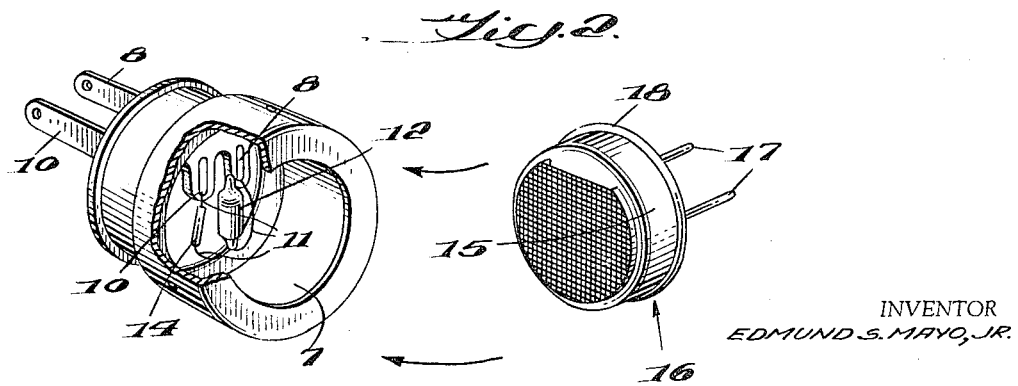
FIG. 2 shows a partly unassembled and partially cut-away perspective view of the detection unit of FIG. 1.

FIG. 2 shows a different view of the detection unit 2 of FIG. 1 in which the photodetector 16 has been removed and the arrangement of the neon lamp 12, resistor 14, and conductor 11 with respect to the interior edges of prongs 8 and 10 is more clearly seen. In this embodiment, the photodetector is removably mounted to provide access to the interior of the detection unit. Such mounting is obtained by having the cylindrical portion 15 of the photodetector interference fit with aperture 7 formed at one end of the housing 6 by an anular shoulder as shown. To assemble, the photodetector 16 need only be hand press-fit into the aperture. Peripheral flange 18 on the photodetector provides a limit stop to the press-fit motion.

When the gas to be detected is carbon monoxide, a particularly suitable reagent 19 is a mixture of palladium chloride and a regenerating amount of hydrochloric acid adsorbed on a solid, particulate inorganic carrier such as silica gel or alumina gel. The PdCl$_2$ rapidly darkens upon contact with CO in a sub-toxic predetermined level of concentration, which darkening is automatically perceived by photodetector 16. A weight ratio of about 0.65 to about 2.0 parts of HCl to each part of $PdCl_2$ tends toward regeneration of the reagent so as to defeat the cumulative effects of harmless gas concentrations and to restore the original color to the reagent when the atmosphere within housing 6 is cleared of carbon monoxide to a concentration less than the predetermined level. The above described $PdCl_2$ reagent is so stable that it will have a life of as much as 6 months or more. When the reagent has ceased to be effective, it can be unloaded from container 20 through the separation 24 in spacer 23, and fresh reagent can be added to the container.

Housing 6 can be made of plastic and is provided with a plurality of openings 25 spaced about its periphery to provide access for the surrounding atmosphere which may contain the gas to be detected. Housing 6 is compact so that the heat generated therewithin by lamp 12 causes the atmosphere being sampled by reagent 19 to rise and be replaced by cooler air from outside the housing. The convection current thereby created insures a proper and continuous sampling to be obtained by the detection unit 2. For the housing 6 size of 1¾ in. x 1 in., openings 25 in circular portion 26 of the housing can be five in number and 3/32 inch in diameter and in portion 28 can be four in number and ⅛ inch in diameter.

The sensitivity of the reagent, just described, to CO is best when an atmosphere containing at least about 20% moisture is present within the housing 6 of the detection unit. When the surrounding atmosphere has a lower water content, the modified detection unit depicted in FIG. 5 may be employed. In FIG. 5 is shown a transparent tube 45 cemented to housing 6 so that the bore of the tube is in register with the lowermost opening 25 in the housing. A water absorbent wick 46 is positioned by the bore of the tube 45 to have one end projecting into the interior of the housing and the other end in contact with water in a reservoir 47. In the embodiment shown, wick 46 is a thin, elongated section of synthetic sponge frictionally held in place by the folding thereof within the bore of tube 45. Hence, the length of the sponge projection into housing 6 is adjustable for purposes of adjusting the relative humidity therein. For the $PdCl_2$ reagent described above, a preferred relative humidity of 25 to 50% is obtained in most instances by having the sponge projection about equal to the radius of the portion 28 of the housing. In moist climates or when gas detection reagents other than the $PdCl_2$ reagent are employed to detect CO or other gases, the modification of FIG. 5 of the detector unit 2 may not be necessary.

The photometric elements of the unit 2 are powered by circuit 4 from a power source such as 115 v., 60 c., supplied via leads 30 and 32. These leads are connected to an isolation transformer 34 used optionally for safety purposes. The lamp 12 and current-limiting resistor 14 combination is connected in series with variable resistance 36 to provide a light intensity adjustment circuit which forms one parallel branch of the load on the secondary winding of isolation transformer 34. The second parallel branch consists of photodetector 16 connected in series with the power supply and relay coil 38. Relay arm 40 is biased towards contact 42, but is held in the position shown in the drawing by the magnetic field of coil 38 when photodetector 16 is receiving full light from lamp 12. When the light intensity reaching photodetector 16 is diminished, as will occur when reagent 18 changes color or darkens ($PdCl_2$ upon contact with CO), the resistance of the photodetector increases thereby decreasing the current to coil 38. As the current in coil 38 decreases, relay arm 40 falls back onto contact 42 at a pre-determined current level and time for a given gas concentration, thereby completing the circuit which actuates an alarm such as horn 44. Variable resistance 36 serves as a zero adjustment, being set initially to allow sufficient current to pass through coil 38 just below a certain level of gas concentration, usually well below the toxic limit, to just hold relay arm 40 in the position shown in the FIG. 1.

In operation of this embodiment of the present invention, power is supplied circuit 4 via leads 30 and 32, with prongs 8 and 10 being inserted in a female electrical fitting, not shown, interposed in parallel relationship across leads 8a and 10a. Thereafter, the surrounding atmosphere is continuously convected through and sampled by the unit 2 to rapidly and automatically warn personnel of the presence of certain gases in sub-toxic or toxic amounts.

Representative examples of gases that can be detected by the apparatus of the present invention and appropriate reactive materials are as follows:

| Gas: | Indicating reagent |
|---|---|
| $H_2S$ | Lead acetate. |
| $CO_2$ | $NaHCO_3$ and phenol red. |
| HCN | Silver nitrate. |
| NO | Griess reagent. |
| CO | $PdCl_2$. |

According to the form of the indicating reagent, various types of modules thereof can be employed with different orientation than is shown in FIG. 1. For example, the module of reagent can be one of the above named reagents contained in a shallow pan horizontally positioned with the photodetector arranged to receive light from the neon lamp by reflective incidence upon the surface of the reagent. The surrounding atmosphere or air that passes over the surface of the shallow pan contacts the reagent therein to be sampled for the presence of a certain gas. Depending upon the nature of the reagent, a shallow pan of wire screening or other porous or perforated material might be used. The module of reagent can also be vertically standing and instead of having a screen container, the container can be made of solid transparent material, e.g., an open top wide mouth glass vial, or of a non-transparent material such as steel, provided with a transparent window such that the photodetector receives light from the neon lamp after transmissive incidence upon the reagent and its container. In such an arrangement, when a solid, granular reagent is employed, light is transmitted therethrough by a process of multiple scattering in which the incident light is reflected from individual particles of the reagent many times. The thickness of the reagent bed in the direction parallel to the incident beam of light from the lamp is usually chosen so that approximately 50% of the incident light passes, by scattering, through the reagent to the detector. Since the emergent light has also been multiply reflected from the surface of the reagent bed, its color (spectral distribution) and the amount of emergent light will be closely related to the color of the reagent. Gas detecting reagents employed in the detection apparatus of the present invention should be color sensitive to the particular gas being detected, preferably to darken so that as darkening occurs, light reaching photodetector 16 from lamp 12 will be of diminished intensity whether the light was reflected from the surface of the reagent or was transmited therethrough. It is possible that the module of reagent will be composed solely of solid carrier and adsorbed reagent.

Any photodetector 16 having an appropriate expanse of light sensitive area and a suitable response time may be used in the detection unit 2 hereinbefore described. An example of a suitable photodetector is the CDS-9 type available from Pioneer Electric and Research Corporation, Forest Park, Illinois.

FIG. 3 shows, schematically, detection apparatus for sensing both fire and the presence of noxious gas. The elements which are identical to those of FIG. 1 are numbered the same. Neon lamp 12 and photodetector 16 are mounted in a housing 6 such as shown in FIG. 1. A bimetallic heat sensor 50, the contacts of which are arranged to open at 1350° F., is connected in series with photodetector 16 to interrupt the current supplied to relay coil 38 at temperatures above 1350° F., thereby releasing relay arm 40 to complete the circuit including the warning horn 44. The heat sensor 50 can be positioned within or fastened to the detection unit 2 so as to have a compact, dual-purpose unit.

In this embodiment, the 115 v. A.C. current is rectified by diode 52 and filtered by capacitor 54. A continuously charged nickel-cadmium storage cell 56 is connected into the horn circuit so that horn 44 is operable even in the event that an A.C. power failure occurs.

FIG. 4 shows a circuit powered by a battery 58 supplying about 112.5 volts of direct current to lamp 12 and photodetector 16. Failure of lamp 12 results in a sounding of horn 44 in this embodiment as in the previous embodiments.

Because of the compactness of the detector unit 2, it can be widely used in industrial locations, particularly where fire or dangerous levels of toxic gas may be encountered, including warehouses, garages, airplane hangars, furnace rooms, mines, and in the vicinity of many industrial processes. The detector unit can also be adapted for use in automobile, trucks, boats, and other vehicles. It can also be used in the home.

In the foregoing applications various types of power circuits having visual or audio alarms or both can be employed. For example, the detector unit may be upon a movable element remotely powered for probe-type analysis. The shape of housing 6 of the detector unit can be changed to fit the needs of its particular use.

Since many widely different embodiments of this invention may be made without departing from the spirit and scope thereof, it is to be understood that this invention is not limited to the specific embodiments thereof except as defined in the appended claims.

What is claimed is:

1. Gas detection apparatus comprising a housing, a module of reagent mounted within said housing, said reagent being color sensitive to the presence of at least one particular gas, said housing having openings to permit atmosphere containing said particular gas to enter and contact said reagent, means to regulate the humidity within said housing, photoelectric means including a lamp and a photodetector positioned within said housing to receive light from said lamp after incidence upon said reagent, whereby color changes of said reagent caused by the presence of said particular gas are sensed by said photodetector, the heat of said lamp serving to convect the surroundnig atmosphere through said housing via said openings therein, and electric means powering said photoelectric means and including an alarm responsive to said photodetector to signal the presence of a predetermined concentrations of said particular gas.

2. The gas detection apparatus of claim 1 wherein said means to regulate the humidity consists of a water supply and a wick having one end in contact with the water of said water supply and the other end extending through one of said openings in said housing into the interior thereof, with the lengths of the projection of said other end of said wick into said interior being adjustable for adjusting the relative humidity within said housing.

References Cited by the Examiner
UNITED STATES PATENTS

| | | | |
|---|---|---|---|
| 892,241 | 6/1908 | Freise. | |
| 1,256,740 | 2/1918 | Steiger | 340—237 |
| 2,153,568 | 4/1939 | Johnson | 340—237 |
| 2,193,315 | 3/1940 | Evelyn | 250—218 X |
| 2,537,028 | 1/1951 | Cahusac et al. | 340—237 X |
| 2,553,179 | 5/1951 | Farr et al. | 340—237 X |
| 2,561,802 | 7/1951 | Klug. | |
| 2,631,247 | 3/1953 | Shaw | 250—239 |
| 2,675,816 | 4/1954 | Giannette | 340—237 X |
| 2,768,370 | 10/1956 | Maninger | 340—237 |
| 2,787,782 | 4/1957 | Rosenblum | 340—237 |
| 2,967,945 | 1/1961 | De Gier | 250—211 X |
| 2,982,950 | 5/1961 | Boyle | 340—237 X |
| 3,048,833 | 8/1962 | Bernheim | 250—239 X |

FOREIGN PATENTS 309,414   4/1929   Great Britain.

NEIL C. READ, *Primary Examiner.*

D. K. MYER, *Assistant Examiner.*